US012710804B2

(12) United States Patent
Sukumaran et al.

(10) Patent No.: US 12,710,804 B2
(45) **Date of Patent: *Aug. 18, 2026**

(54) DYNAMIC MANAGEMENT OF DATA CENTERS

(71) Applicant: Cerner Innovation, Inc., Kansas City, MO (US)

(72) Inventors: Karthikeyan Sukumaran, Chester Springs, PA (US); Sravan Kumar Anumula, Denvon, PA (US); Rakesh Reddy Yarragudi, Malvern, PA (US); Manipal Reddy Thoomukunta, Malvern, PA (US); Deepak Kumar Jain, Chester Springs, PA (US)

(73) Assignee: Cerner Innovation, Inc., Kansas City, MO (US)

( * ) Notice: Subject to any disclaimer, the term of this patent is extended or adjusted under 35 U.S.C. 154(b) by 82 days.

This patent is subject to a terminal disclaimer.

(21) Appl. No.: 18/922,094

(22) Filed: Oct. 21, 2024

(65) Prior Publication Data

US 2025/0060807 A1 Feb. 20, 2025

Related U.S. Application Data

(60) Continuation of application No. 18/317,280, filed on May 15, 2023, now Pat. No. 12,153,483, which is a (Continued)

(51) Int. Cl.

*G06F 1/3287* (2019.01)
*G06F 1/28* (2006.01)

(Continued)

(52) U.S. Cl.

CPC .............. *G06F 1/3287* (2013.01); *G06F 1/28* (2013.01); *G06F 11/0721* (2013.01);

(Continued)

(58) Field of Classification Search

CPC ...... G06F 1/3287; G06F 1/28; G06F 11/0721; G06F 11/0793; G06F 1/30; G06F 11/0709; G06F 11/3055

(Continued)

(56) References Cited

U.S. PATENT DOCUMENTS 11,669,150 B1 * 6/2023 Sukumaran ......... G06F 11/0793 713/324
2006/0184287 A1 * 8/2006 Belady .................. G06F 1/3287 700/291

(Continued)

*Primary Examiner* — Ji H Bae
(74) *Attorney, Agent, or Firm* — Invoke

(57) ABSTRACT

Computerized systems and methods are provided to intelligently and dynamically manage a data center comprising at least one server and at least one central manager. The central manager is programmed to access the at least one server on a predetermined schedule to determine whether at least one application is functioning properly by determining a functionality level. Alternatively, the central manager determines whether the at least one server is actively used by determining an activity level for the server. Based on the central manager's determinations, the system dynamically adjusts the power level of the server, resulting in reduced power consumption and a reduction in wasted resources and unnecessary processing power in the management of servers in a data center.

20 Claims, 6 Drawing Sheets

Related U.S. Application Data continuation of application No. 17/328,675, filed on May 24, 2021, now Pat. No. 11,669,150, which is a division of application No. 15/855,580, filed on Dec. 27, 2017, now Pat. No. 11,048,320.

(51) Int. Cl.
*G06F 1/30* (2006.01)
*G06F 11/07* (2006.01)
*G06F 11/30* (2006.01)

(52) U.S. Cl.
CPC ............ *G06F 11/0793* (2013.01); *G06F 1/30* (2013.01); *G06F 11/0709* (2013.01); *G06F 11/3055* (2013.01)

(58) Field of Classification Search
USPC ............................................ 713/324; 714/24
See application file for complete search history.

(56) References Cited

U.S. PATENT DOCUMENTS

| | | | | |
|---|---|---|---|---|
| 2007/0073709 | A1* | 3/2007 | Lim | G06F 1/3203 |
| 2009/0089470 | A1* | 4/2009 | Ven | G06F 1/3203<br>710/260 |
| 2010/0306779 | A1* | 12/2010 | Yengulalp | G06F 9/5038<br>718/103 |
| 2013/0246001 | A1* | 9/2013 | Uchida | G06F 11/0751<br>702/182 |
| 2018/0159735 | A1* | 6/2018 | Beyh | G06F 9/5061 |

* cited by examiner

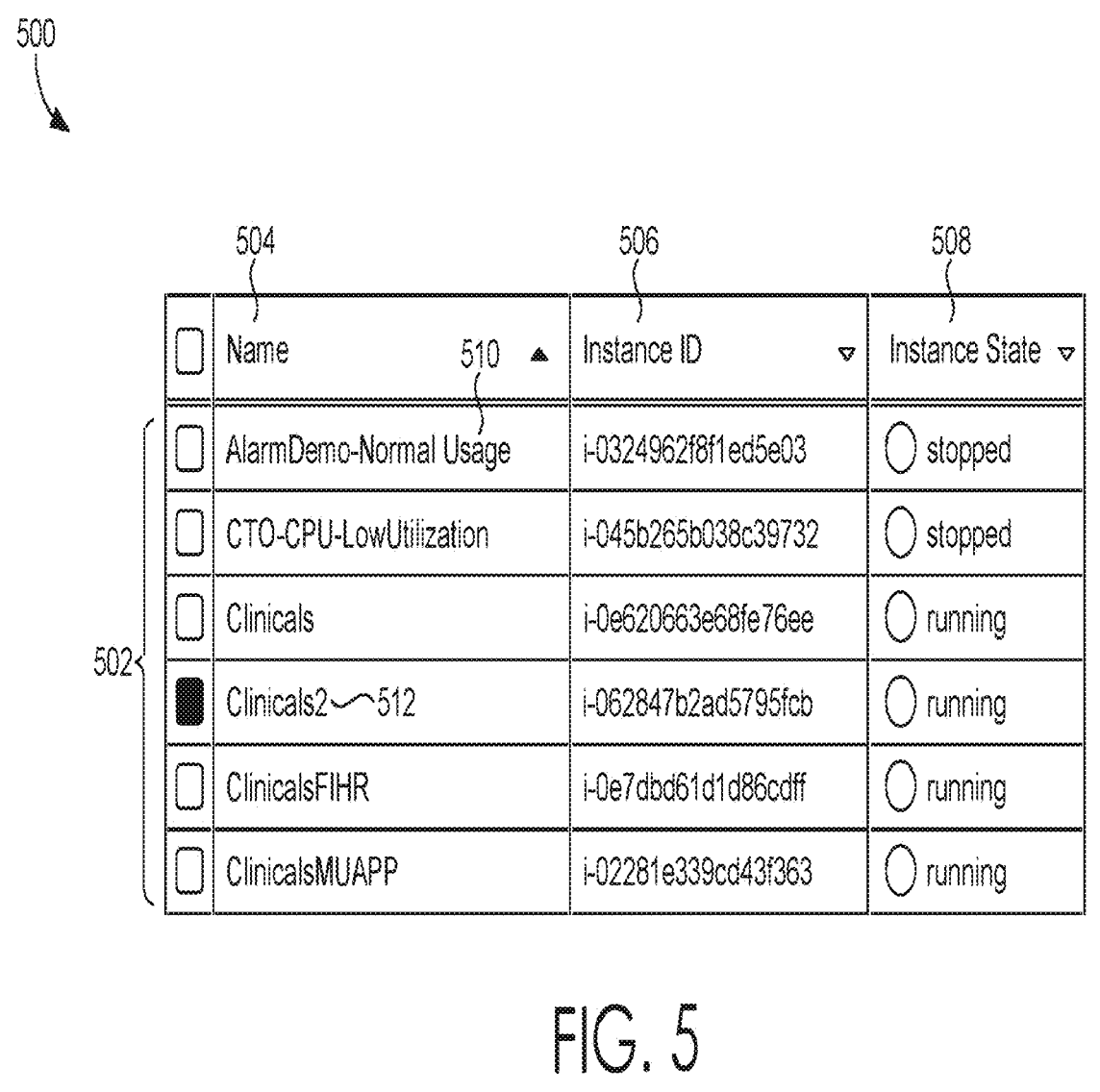

| ☐ | Name ▲ | Instance ID ▽ | Instance State ▽ |
|---|---|---|---|
| ☐ | AlarmDemo-Normal Usage | i-0324962f8f1ed5e03 | ○ stopped |
| ☐ | CTO-CPU-LowUtilization | i-045b265b038c39732 | ○ stopped |
| ☐ | Clinicals | i-0e620663e68fe76ee | ○ running |
| ■ | Clinicals2 | i-062847b2ad5795fcb | ○ running |
| ☐ | ClinicalsFIHR | i-0e7dbd61d1d86cdff | ○ running |
| ☐ | ClinicalsMUAPP | i-02281e339cd43f363 | ○ running |

FIG. 5

DYNAMIC MANAGEMENT OF DATA CENTERS

INCORPORATION BY REFERENCE; DISCLAIMER

Each of the following applications are hereby incorporated by reference: application Ser. No. 18/317,280, filed on May 15, 2023; Application Ser. No. 17/328,675, filed on May 24, 2021; Application Ser. No. 15/855,580, filed on Dec. 27, 2017. The applicant hereby rescinds any dis claimer of claims s cope in the parent application(s) or the prosecution history thereof and advise the USPTO that the claims in the application may be broader that any claim in the parent application(s).

BACKGROUND

Historically, data centers comprise multiple servers that are housed in a central location and require routine maintenance. Usually, the servers remain on at all times, regardless of their activity level or functionality level. Keeping multiple servers running, housing, and maintaining servers is expensive and requires significant power usage and resources. As cloud-based data centers were introduced and have become more mainstream, companies are moving from traditional data centers to cloud-based data centers to reduce costs. While cloud-based data centers reduce the cost of housing servers since no physical location is required to house the servers, cloud-based data centers are only more cost efficient when they are managed well. The cost of running and maintaining data centers remains high and a financial obstacle for many companies.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

Embodiments of the present invention generally relate to computerized systems and methods that facilitate the dynamic management of data centers in order to reduce the cost of utilizing data centers for business use. In accordance with the technology described herein, the system comprises at least one computer server ("server") to be monitored and at least one central manager. The central manager is programmed to access the at least one server on a predetermined schedule to identify whether or not the server is in use and/or functioning properly. In some embodiments, the identification of the functionality level of at least one application running on the server indicates whether the server is functioning properly. If the functionality level of the at least one application is determined to be positive, then the system will maintain the current power level of the server. However, if the functionality level is determined to be negative, then the system will dynamically adjust the power level of the server.

In other embodiments, the central manager accesses the at least one server to determine an activity level percentage that indicates whether or not the server is in use. If the activity level determined is greater than or equal to a predetermined threshold percentage, then the power level of the server will be maintained. An activity level percentage determined to be below a predetermined threshold percentage indicating that the server is not in use will be dynamically adjusted off. This will result in decreased power consumption as the server will only be running when it is actively being used.

BRIEF DESCRIPTION OF THE SEVERAL VIEWS OF THE DRAWINGS

The present invention is described in detail below with reference to the attached drawing figures, wherein:

FIG. 5 is a screenshot showing a user interface where the system is dynamically managing servers in the data center in accordance with an embodiment of the present invention.

DETAILED DESCRIPTION

Figure 1:
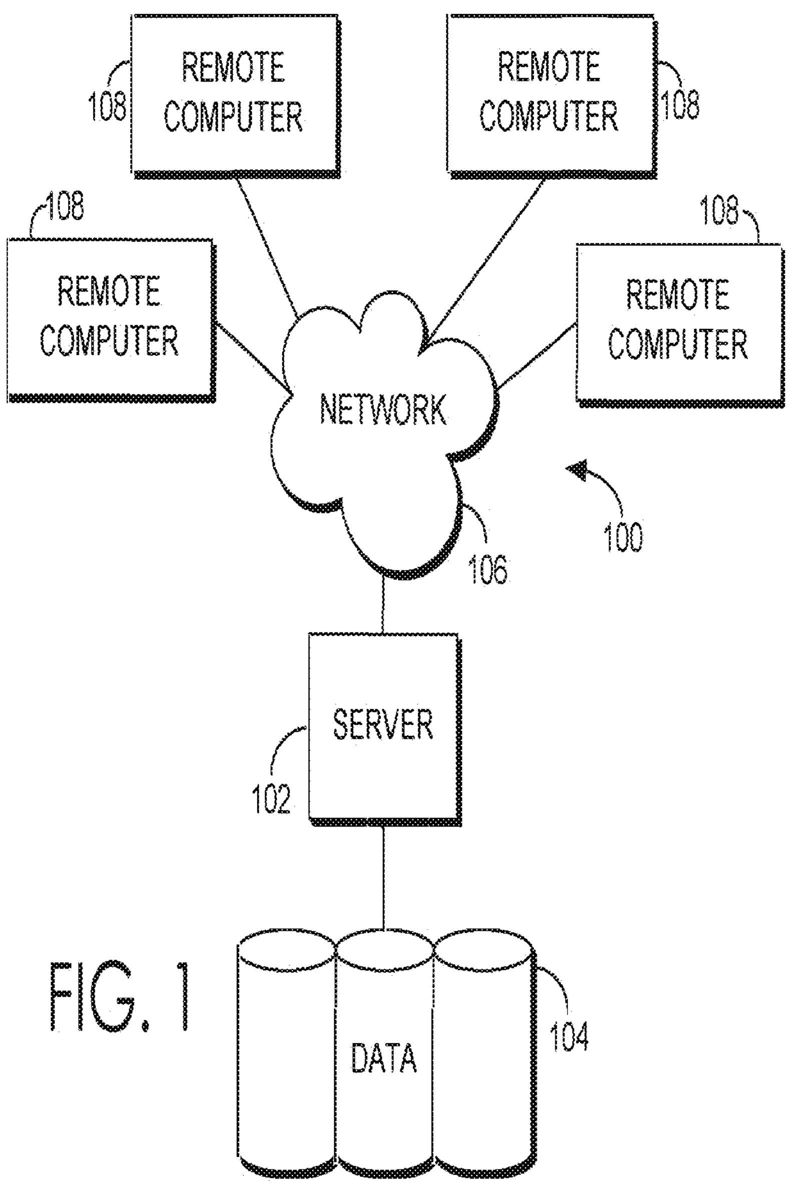
FIG. 1 is a block diagram of an exemplary system architecture in which embodiments of the invention may be employed.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Traditional data centers may comprise multiple servers housed in a central location and the servers require routine maintenance. Generally, the servers remain on at all times, regardless of their activity level or functionality level. The housing and maintenance of data centers has historically been costly, both monetarily and with respect to power usage. These high costs have driven many companies to move to cloud-based data centers as that technology has become more accessible. This move is, in part, driven by the thought that cloud-based data centers will be more cost efficient since there is no physical storage of the servers is needed, which eliminates the cost associated with housing servers in a location. However, cloud-based data centers are only more cost efficient when they are managed well. Often times, cloud-based data centers may not result in decreased costs if the management of such data centers is inefficient and servers are always on, even when they are not in use or are functioning improperly.

The management of data centers may become more inefficient and costly as the number of servers increase. For example, management of a data center comprising ten servers is much simpler than the management of a data center with hundreds of servers. The more servers, the more challenging it is to efficiently manage the use and functionality of such servers. As such, if there are several servers running in a data center at all times without continuous monitoring of such servers, the cost will remain very high. For instance, if 100 servers are running 24 hours a day, 7 days a week, the monthly charge to maintain such servers may be $75,000/month. However, if the servers are monitored and managed so that the servers are only running when functioning properly or in active use, the cost to maintain hundreds of servers on a data center may decrease significantly. Therefore, servers that are continuously monitored and instead run only 40 hours per week, can reduce the cost to about $20,000/month, resulting in a large savings.

Additionally, there are difficulties in managing data centers with a large number of servers from a coordination view. For instance, coordinating shut downs of servers with others that are working on the set of servers is difficult, having multiple versions of servers running can also cause various issues, and different servers may be required for different versions of software. These are just some of the issues encountered with a large number of servers to manage.

Therefore, it is advantageous to utilize systems and methods that manage data centers effectively and efficiently to reduce cost. This can be achieved, as described herein, through the use of intelligent systems that monitor computer servers within a data center to determine whether the servers are in use and whether the servers are functioning properly. If a server is not functioning properly or is not being used, then the system can dynamically power off the server. Accordingly, computer servers will remain on only when in use and functioning properly, thereby reducing the cost of maintaining data centers.

Embodiments of the present technology address the challenge of managing data centers in an efficient manner that results in decreased power consumption. Generally, embodiments of the present invention are directed to methods and systems for dynamically managing a data center in order to reduce power consumption. The system for the dynamic management of the data center comprises at least one server to be monitored and at least one central manager. The central manager is programmed to access the at least one server on a predetermined schedule to identify a functionality level of at least one application running on the at least one server or identify an activity level of the server. Based on such determinations, the power level of the server may be dynamically adjusted or maintained.

An exemplary computing environment suitable for use in implementing embodiments of the present invention is described below. FIG. 1 is an exemplary computing environment (e.g., medical-information computing-system environment) with which embodiments of the present invention may be implemented. The computing environment is illustrated and designated generally as reference numeral 100. The computing environment 100 is merely an example of one suitable computing environment and is not intended to suggest any limitation as to the scope of use or functionality of the invention. Neither should the computing environment 100 be interpreted as having any dependency or requirement relating to any single component or combination of components illustrated therein. It will be appreciated by those having ordinary skill in the art that the connections illustrated in FIG. 1 are also exemplary as other methods, hardware, software, and devices for establishing a communications link between the components, devices, systems, and entities, as shown in FIG. 1, may be utilized in the implementation of the present invention. Although the connections are depicted using one or more solid lines, it will be understood by those having ordinary skill in the art that the exemplary connections of FIG. 1 may be hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though devices and components are represented in FIG. 1 as singular devices and components, it will be appreciated that some embodiments may include a plurality of the devices and components such that FIG. 1 should not be considered as limiting the number of a device or component.

The present technology might be operational with numerous other special-purpose computing system environments or configurations. Examples of well-known computing systems, environments, and/or configurations that might be suitable for use with the present invention include personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention may be operational and/or implemented across computing system environments such as a distributed or wireless "cloud" system. Cloud-based computing systems include a model of networked enterprise storage where data is stored in virtualized storage pools. The cloud-based networked enterprise storage may be public, private, or hosted by a third party, in embodiments. In some embodiments, computer programs or software (e.g., applications) are stored in the cloud and executed in the cloud. Generally, computing devices may access the cloud over a wireless network and any information stored in the cloud or computer programs run from the cloud. Accordingly, a cloud-based computing system may be distributed across multiple physical locations.

The present technology might be described in the context of computer-executable instructions, such as program modules, being executed by a computer. Exemplary program modules comprise routines, programs, objects, components, and data structures that perform particular tasks or implement particular abstract data types. The present invention might be practiced in distributed computing environments where tasks are performed by remote processing devices that are linked through a communications network. In a distributed computing environment, program modules might be located in association with local and/or remote computer storage media (e.g., memory storage devices).

With continued reference to FIG. 1, the computing environment 100 comprises a computing device in the form of a control server 102. Exemplary components of the control server 102 comprise a processing unit, internal system memory, and a suitable system bus for coupling various system components, including data store 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The control server 102 typically includes therein, or has access to, a variety of non-transitory computer-readable media. Computer-readable media can be any available media that might be accessed by control server 102, and includes volatile and nonvolatile media, as well as, removable and nonremovable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by control server 102. Computer-readable media does not include signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The control server 102 might operate in a computer network 106 using logical connections to one or more remote computers 108. Remote computers 108 might be located at a variety of locations including operating systems, device drivers and medical information workflows. The remote computers might also be physically located in traditional and nontraditional medical care environments so that the entire medical community might be capable of integration on the network. The remote computers might be personal computers, servers, routers, network PCs, peer devices, other common network nodes, or the like and might comprise some or all of the elements described above in relation to the control server. The devices can be personal digital assistants or other like devices. Further, remote computers may be located in a variety of locations including in a medical or research environment, including clinical laboratories (e.g., molecular diagnostic laboratories), hospitals and other inpatient settings, veterinary environments, ambulatory settings, medical billing and financial offices, hospital administration settings, home healthcare environments, and clinicians' offices. Medical professionals may comprise a treating physician or physicians; specialists such as surgeons, radiologists, cardiologists, and oncologists; emergency medical technicians; physicians' assistants; nurse practitioners; nurses; nurses' aides; pharmacists; dieticians; microbiologists; laboratory experts; laboratory technologists; genetic counselors; researchers; veterinarians; students; and the like. The remote computers 108 might also be physically located in nontraditional medical care environments so that the entire medical community might be capable of integration on the network. The remote computers 108 might be personal computers, servers, routers, network PCs, peer devices, other common network nodes, or the like and might comprise some or all of the elements described above in relation to the control server 102. The devices can be personal digital assistants or other like devices.

Computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networking environment, program modules or portions thereof might be stored in association with the control server 102, the data store 104, or any of the remote computers 108. For example, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) might be utilized.

In operation, an organization might enter commands and information into the control server 102 or convey the commands and information to the control server 102 via one or more of the remote computers 108 through input devices, such as a keyboard, a microphone (e.g., voice inputs), a touch screen, a pointing device (commonly referred to as a mouse), a trackball, or a touch pad. Other input devices comprise satellite dishes, scanners, or the like. Commands and information might also be sent directly from a remote medical device to the control server 102. In addition to a monitor, the control server 102 and/or remote computers 108 might comprise other peripheral output devices, such as speakers and a printer.

Although many other internal components of the control server 102 and the remote computers 108 are not shown, such components and their interconnection are well known. Accordingly, additional details concerning the internal construction of the control server 102 and the remote computers 108 are not further disclosed herein.

Figure 2:
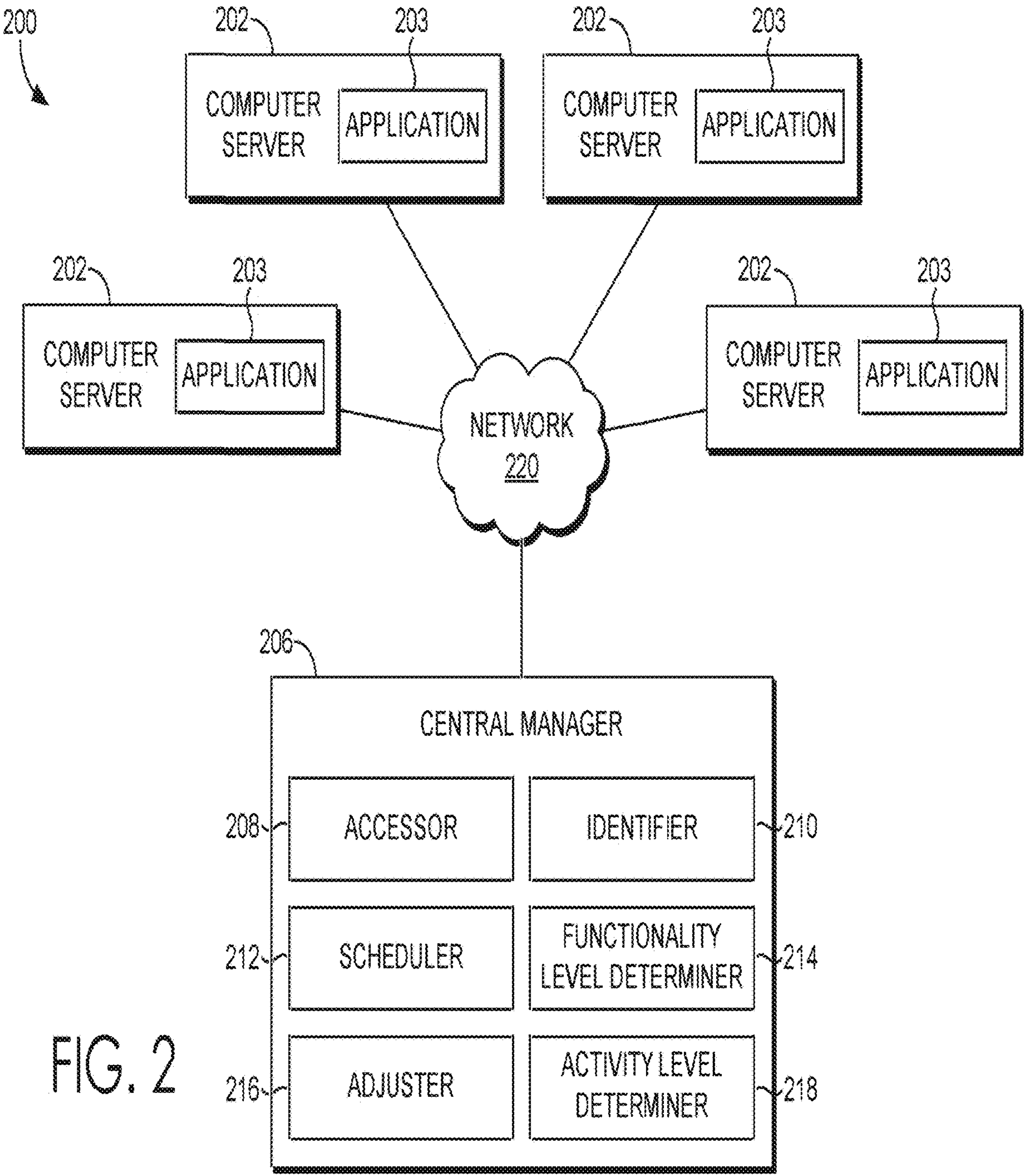
FIG. 2 is an exemplary system architecture suitable to implement embodiments of the present invention.

Turning now to FIG. 2, an exemplary computing system 200 is depicted. The computing system 200 is merely an example of one suitable computing system and is not intended to suggest any limitation as to the scope of use or functionality of embodiments of the present invention. Neither should the computing system 200 be interpreted as having any dependency or requirement related to any single component or combination of components illustrated herein.

The system 200 includes at least one computer server 202, a network 220, and a central manager 206. The server 202 may comprise at least one application 203. It is contemplated that each server may comprise several applications 203 and the number and type of applications 203 within each server 202 in the system 200 may vary.

The central manager 206 is comprised of an accessor 208, an identifier 210, a scheduler 212, a functionality level determiner 214, an adjuster 216, and an activity level determiner 218. In other embodiments, the central manager 206 may include any number of components necessary for the analysis and determination of the activity level of a server or functionality level of an application.

As depicted, the system 200 is comprised of one central manager 206, but it is contemplated the system 200 may include more than one central manager 206. It will be appreciated that some or all of the subcomponents of the central manager 206 may be accessed via the network 220 and may reside on one or more devices. The central manager 206 can perform monitoring on some or all of the servers 202.

In some embodiments, one or more of the illustrated components may be implemented as a stand-alone application. The components described are exemplary in nature and in number and should not be construed as limiting. Any number of components may be employed to achieve the desired functionality within the scope of the embodiments hereof.

Generally, the central manager 206 is set to dynamically manage a data center during working hours (e.g., 8:00 AM to 6:00 PM). In embodiments, the central manager 206 may be set to monitor and access the at least one server 202 at any time during the day on any day of the week. The predetermined schedule may be set by the scheduler 212 and based upon the needs of a company utilizing the data center. For example, in a hospital or clinical setting, it may be critical for servers 202 to continue to run after traditional work hours as there may be applications running that are a necessary part of the management of patients in the hospital. Such servers may remain on all day, every day and monitoring of such servers 202 by the central manager 206 may occur on a predetermined schedule determined by the scheduler 212 that is outside of traditional work hours (e.g. every hour of the day/7 days a week).

The scheduler 212 within the central manager 206 is configured to determine the predetermined schedule for accessing the servers 202 for activity level or functionality level determinations. The scheduler 212 may set a predetermined schedule for accessing the server 202 based on any variety of factors. In some instances, the scheduler 212 may set the accessor 208 to access the server 202 within 30 minutes of the server 202 being turned on to determine whether it is being actively used. In other instances, the scheduler 212 may set the accessor 208 to access the server 202 at set intervals throughout the working day (e.g. every hour between 9:00 AM and 6:00 PM). The scheduler 212 may determine the schedule based on the primary function of the server 202.

Additionally, the scheduler 212 can schedule different servers 202 within the system 200 to be monitored at different times. It is also contemplated that the scheduler 212 may designate certain servers 202 for monitoring at certain times and exclude the same servers 202 at other times during the predetermined schedule. Any and all variations of monitoring schedules are contemplated herein.

Data center sizes may also vary. Some data centers may comprise only a few servers 202 while others may comprise hundreds or more. The central manager 206 may be programmed to monitor at least one server 202 within the data center, but may monitor any number of servers designated for monitoring. Some servers within the system 200 may not be designated for monitoring. Such servers may include those servers that are critical and must remain on at all times, thereby making monitoring of such servers unnecessary. Further, a certain number or percentage of servers 202 within the data center may be designated for monitoring while others are not. Those that are not designated for monitoring can be automatically or manually powered on or off.

The system 200 is designed to dynamically manage a data center to decrease the cost and power requirements of running and maintaining a data center comprising at least one server 202. The central manager 206 is programmed to access the at least one server 202 on a predetermined, configurable schedule. While the number of times the accessor 208 accesses the server 202 may vary, the accessor will access the server 202 at least once during the predetermined schedule.

The accessor 208 within the central manager 206 accesses the server 202 to be monitored on the predetermined schedule set by the scheduler 212. The accessor 208 may access one or multiple applications 203 running on the server 202. The accessor 208 may further be programmed to access only those servers 202 that are tagged for monitoring and ignore those servers 202 that are not tagged for monitoring. For example, if the server 202 is running several applications 203, some applications 203 may be basic applications 203 necessary for the computer to complete basic functions such as the task manager or a firewall program. As such, these applications 203 may be tagged in such a way that they will not be accessed by the accessor 208 or monitored by the central manager 206. The accessor 208 may not monitor such applications as their functionality level may not truly indicate whether or not the application 203 is functioning properly and whether the server 202 should remain powered on.

Once the accessor 208 accesses the server 202 to be monitored, the identifier 210 may identify a functionality level of the application 203. Identifying the functionality level comprises determining whether the application 203 is working or not. For example, if an application 203 is running, but is continuously crashing each time an individual using the server tries to use the application 203, the identifier 210 will identify that the application 203 is failing resulting in a negative functionality level determination. In other situations, the application's 203 speed and performance may be optimal, resulting in a positive functionality level determination. Further, the application's 203 performance may be less than optimal but not completely failing. This scenario may be categorized as a negative functionality level determination (as performance is less than optimal) or a positive functionality level determination (as it is not completely failing) depending on client customizations and settings. The functionality level determinations may be configured for a variety of outcomes. The positive and negative functionality level determinations are determined by a functionality level determiner 214 based on performance metrics identified by the identifier 210. In other words, once the identifier 210 identifies the functionality level of the application 203, the functionality level determiner 214 will determine whether the functionality level is positive or negative. A positive functionality level occurs when the application 203 is running properly. For example, this would be when an application 203 is running on the server 202 and completing all tasks as it is programmed to do. A negative functionality level occurs when the application 203 is not functioning properly. Examples of improper functionality of an application 203 may include but are not limited to the application crashing, stalling, moving slowly, or committing errors.

After the functionality level determiner 214 makes a determination as to whether the functionality level of the at least one application 203 is positive or negative, the adjuster 216 will either dynamically adjust the power level of the server 202 or maintain the power level of the server 202. If an application 203 is failing and has a negative functionality level, the server may be dynamically powered down. Dynamically adjusting the power level of the server 202 to off (i.e., powering down) when the functionality level determination of an application 203 is negative will reduce costs and power consumption and maintain a more efficient data center.

In another embodiment, the central manager 206 comprises an accessor 208 that is programmed to access a server 202 on a predetermined schedule set by the scheduler 212. In this embodiment, the central manager 206's identifier 210 identifies an activity level of the server rather than a functionality level of at least one application 203. An activity level, as used herein, refers generally to an amount of use or activity of the server. The identifier 210 will identify a first activity level of the server 202 that comprises a percentage value between 0 and 100.

Once the first activity level is identified by the identifier 210, the activity level determiner 218 will determine whether the first activity level of the server 202 is greater than a predetermined threshold percentage. The predetermined threshold percentage may vary, but it is contemplated that the predetermined threshold percentage is 10% and an activity level percentage determined to be less than 10% indicates that the server 202 is not being actively used.

If the first activity level percentage is greater than the predetermined threshold percentage, then the adjuster 216 may maintain the current power level and allow the server 202 to continue to run. Even though it is allowed to run, the scheduler 212 may schedule the accessor 208 and identifier 210 to access and identify additional activity level determinations at subsequent monitoring intervals. The additional monitoring provides the opportunity for the server 202 to be dynamically adjusted to power off once the activity level determination falls below the predetermined threshold percentage.

If the first activity level percentage is less than the predetermined threshold percentage, then the accessor 208 may access the server 202 a second time. For example, if the first activity level percentage was at 8%, with a threshold percentage value of 10%, then the accessor 208 may access the server 202 a second time to identify a second activity level at a later time (e.g. thirty minutes later.) The timing of the second access by the accessor 208 may occur on a predetermined schedule set by the scheduler 212. The timing of the subsequent access of the server 202 may vary and any and all variations of a predetermined schedule are contemplated herein.

After the accessor 208 accesses the server 202 a second time, the identifier 210 may identify a second activity level of the server 202. Once again, the second activity level of the server 202 will be a percentage value between 0 and 100. The activity level determiner 218 may then determine a second activity level of the server 202. If the second activity level of the server 202 remains below the predetermined threshold percentage (e.g. below 10%), then the adjuster 216 may dynamically power off the server 202. In embodiments, a second access for a second activity level may not be necessary and the adjuster 216 may automatically power down the server based on the first activity level being below the threshold.

Figure 3:
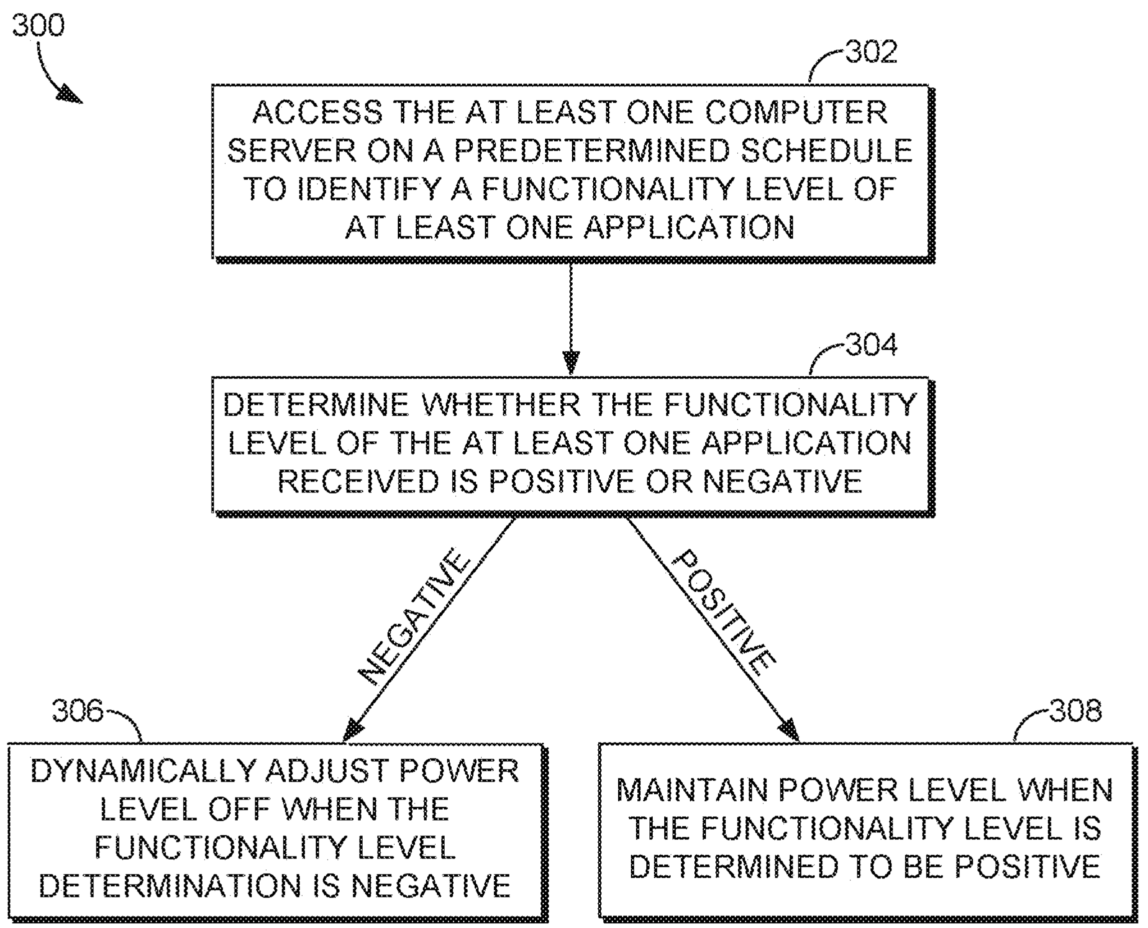
FIG. 3 is a flow diagram showing an exemplary method for determining the functionality level of at least one application and dynamically adjusting the power level of a server based on such determination.

Turning now to FIG. 3, a flow diagram is depicted of an exemplary method 300 of accessing a server 202 to determine an application functionality level and then dynamically adjusting the power level of the server 202 based on the functionality level determination. The method 300 may be implemented by the computing system architecture 200 described with respect to FIG. 2.

At step 302, the accessor 208 of FIG. 2 within the central manager 206 accesses the at least one server 202 on a predetermined schedule set by the scheduler 212 and the identifier 210 identifies a functionality level of the at least one application 203. Next, at step 304, the functionality level determiner 214 determines whether the functionality level of the at least one application 203 is positive or negative. As discussed above, a positive functionality level of the at least one application 203 accessed indicates that the application 203 is running properly, whereas a negative functionality level indicates that the application 203 is not functioning properly. Based on the functionality level determination, the adjuster 216 will dynamically adjust the power level of the at least one server 202. When the functionality level is negative, the adjuster 216 will dynamically adjust the server to off at step 306. When the functionality level determined is positive, the adjuster 216, at step 308, will maintain the power level of the server 202, allowing the application 203 and server 202 to continue to run.

In exemplary embodiments, the functionality level of the at least one application 203 may be accessed and identified a second time by the accessor 208 and identifier 210 based on a predetermined schedule set by the scheduler 212. For example, after a positive functionality level determination, the accessor 208 may access the at least one application 203 again. The second access and identification of the application functionality level may be done on any schedule deemed appropriate by the scheduler 212, such as an hour after the first functionality level determination. Additionally, if the second functionality level determination is also positive, additional times for additional functionality level determinations may be set by the scheduler 212. For example, the scheduler 212 may set the accessor 208 and identifier 210 to access and identify the functionality level of the at least one application 203 each hour after each positive functionality level determination. This would allow the central manager 206 to continue to monitor the application 203 to ensure that the application 203 is continuing to function properly in order to maintain the server 202 power level. If at some point during the monitoring schedule, the application 203 is no longer functioning properly and a negative functionality level determination is determined, then the adjuster 216 can dynamically power off the server 202. This intelligent and continuous monitoring will ensure that the servers are being shut down when they are not functioning properly, resulting in decreased power consumption.

Further, while the central manager 206 is described as monitoring one application 203 on one server 202, it may monitor any number of applications on any number of servers 202. For example, the central manager 206 may be dynamically managing hundreds of servers 202 with hundreds of applications 203 running or the system may monitor several applications 203 on one server 202. Any and all variations contemplated are included herein.

Additionally, in some embodiments, when the central manager 206 is monitoring multiple applications 203 on one server 202 on a predetermined schedule set by the scheduler 212, there may be a hierarchy of importance of applications 203 running. Based on the functions of an individual server 202, certain applications 203 may be more critical than others. Accordingly, if the central manager 206 accesses and identifies multiple functionality levels of multiple applications 203 on a server 202, each application 203 may have a certain level of importance. For example, a server 202 running in a hospital that is monitoring a patient in the intensive care unit (ICU) has several critical functions. As such, it would not be wise to power off such a server 202 if one application 203 was not functioning properly as shutting down such a server 202 could have devastating results. In these instances, it is contemplated that the central manager 206's adjuster 216 could shut down the applications 203 that are failing or not functioning properly, while allowing the critical applications to remain on. This would result in a decrease of power usage on the server 202. Additionally, servers 202 that are providing critical functions, such as monitoring critically ill patients, may be tagged for not monitoring in some embodiments. Such servers 202 may be too important in managing the health and monitoring of patients such that they should never (or rarely) be shut off.

On the other hand, a different server 202 within the hospital system may be at an administrative employee's desk and running several different applications 203 related to administrative work only. There may be a hierarchy of importance of applications established on this type of server 202 as well. However, in this instance, if one application 203 was failing and determined to have a negative functionality level by the functionality level determiner 214, then the server 202 may be dynamically adjusted off by the adjuster 216. Servers 202 that provide non-critical functions (e.g. server running applications related only to administrative functions), can be tagged, monitored, and dynamically powered off when even one application 203 has a negative functionality level indicating it is functioning improperly.

Further, in some instances, whether or not the server 202 is dynamically powered off by the adjuster 216, may depend on the importance level of the application 203. Some applications may be deemed essential while others may be non-essential. Therefore, if a non-essential application 203 has a negative functionality level, it may be ignored so long as the essential applications 203 have positive functionality levels and the adjuster 216 may allow the power to be maintained on the server 202. However, if an essential application 203 is determined to have a negative functionality level while some non-essential applications 203 are determined to have a positive functionality level, the adjuster 216 can power off the whole server 202, since it would likely not be carrying out its primary functions as intended. Servers 202 not functioning for their intended use may be turned off when not functioning properly, thereby providing reductions in power consumption and resources utilized to maintain a non-functioning server.

In some embodiments, when the central manager 206 is monitoring several applications 203 on a server 202 and both positive and negative functionality levels are determined, the server 202 may shut down certain applications 203 only and allow the rest of the server to continue to run. The determination to have the server 202 continue to run may be dependent on a server's primary function (e.g. administrative versus monitoring health of a patient) or could be dependent on other factors such a time of day, number of users, primary function of the server 202, etc. Therefore, while the adjuster 216 of the central manager 206 could potentially maintain a power level of the server 202 even after a negative functionality level determination of one application 203, the failing application 203 may be turned off which would still improve the functionality of the server 202 and reduce unnecessary resource utilization such as processing power to maintain the non-functioning components.

Figure 4:
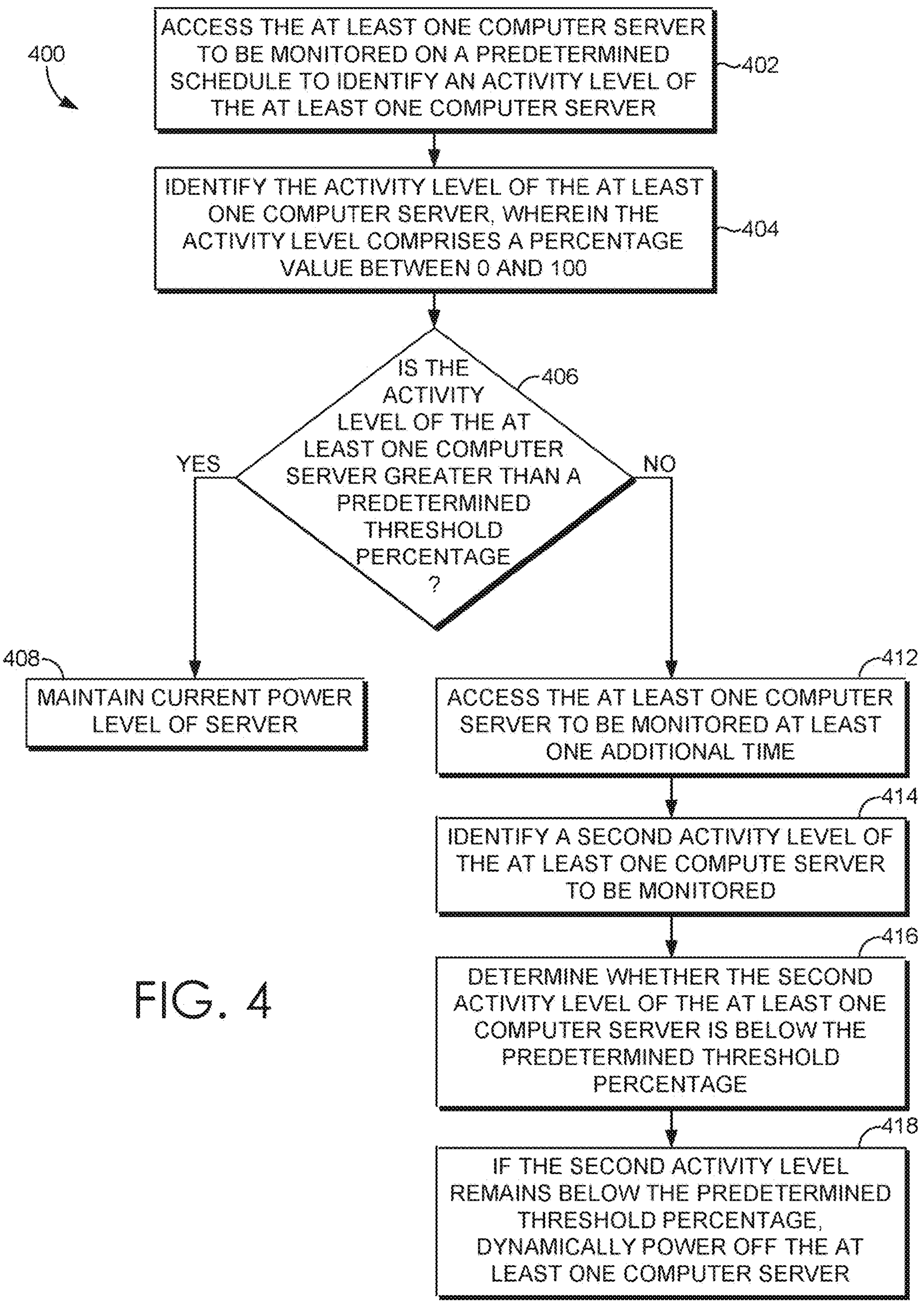
FIG. 4 is a flow diagram showing an exemplary method for determining the activity level of at least one server and dynamically adjusting the power level of the server based on such determination.

Turning now to FIG. 4, a flow diagram is provided showing a method 400 for identifying an activity level of at least one server 202 within a data center and dynamically adjusting the power of the server 202 based on the activity level determination. The method 400 may be implemented by the computing system architecture 200 described with respect to FIG. 2.

As shown at block 402, the accessor 208 of FIG. 2 accesses the at least one server 202 to be monitored on a predetermined schedule set by the scheduler 212. At step 404, the identifier 210 identifies the activity level of the server 202. The activity level identified by the identifier 210 may comprise a percentage between 0 and 100.

Next, the activity level determiner 218 will determine whether the activity level is greater than or equal to a predetermined threshold percentage at step 406. If the activity level determined by the activity level determiner 218 is equal to or greater than the threshold percentage at step 406, then the adjuster 216 will maintain the current power level at step 408. If the activity level determined at step 406 is not equal to or greater than the predetermined threshold percentage, then the accessor 208 will access the server 202 at least one additional time at step 412 and the identifier 210 will identify a second activity level of the server 202 at step 414. Then, at step 418, the activity level determiner 218 will subsequently determine whether the second activity level is once again below the predetermined threshold percentage. Finally, at step 418, if the second activity level determined remains below the threshold percentage, the adjuster 216 will dynamically adjust the power level of the server 202 and turn the server 202 off.

In some instances, if the second activity level is greater than or equal to predetermined threshold percentage, then the scheduler 212 may set a third time for the accessor 208 to access the server 202 and the identifier 210 to identify a third activity level. If the third activity level determination is determined to be greater than the predetermined threshold percentage by the activity level determiner 218, then the adjuster 216 may continue to dynamically maintain the current power level of the server 202. The scheduler 212 may schedule additional monitoring of the server 202 to ensure that the server remains on when the activity level percentage remains above the predetermined threshold percentage.

In some embodiments, the predetermined threshold percentage may remain the same for each time the server 202 is accessed by the accessor 208 and an activity level is determined by the identifier 210. In other embodiments, the predetermined threshold percentage may vary for each time the server 202 is accessed. Additionally, it is contemplated that the predetermined threshold percentages may be different for different servers 202.

In some instances, even if the activity level determined is below the threshold percentage after multiple identifications by the identifier 210, the server 202 may still remain on. This may occur when the particular server 202 provides critical functions. Such critical servers 202 may be monitored by the central manager 206 or may be tagged for no monitoring, as they need to always remain on. In cases where servers 202 are monitored but not dynamically powered off by the adjuster 216 in response to multiple activity level determinations below the threshold percentage, the central manager 206 may report activity level determinations below the threshold percentage of critical servers 202 to individuals overseeing the management of the data center so that the servers 202 may be checked and any problems can be fixed.

The servers 202 may be dynamically adjusted on and off throughout a working day based on the activity and functionality level determinations. However, regardless of the status of the activity and functionality level, the scheduler 212 may schedule a set time each day when the servers 202 are all powered off or all powered on (e.g. powered on at 9:00 AM and powered off at 6:00 PM). In some cases, this may be at the end of a work day or at a time when the servers 202 are no longer being used. In other cases, the time to power off some servers 202 may vary. For example, certain servers 202 may remain on at all times, while others are powered on and running during specific windows of time (e.g. working hours or overnight). Based on the primary function of each server 202, the scheduled powering on/off will vary. This dynamic management and adjustment by the adjuster 216 at the times scheduled by the scheduler 212 will also increase efficient management of the data centers and result in power consumption savings as the servers 202 within the data center 200 will only remain on when in use.

The scheduler 212 may also be configured to trigger the adjuster 216 to dynamically power off a server 202 after a specific time when the server would not be in use as the primary function of that server 202 is not occurring. For example, the adjuster 216 may dynamically adjust the server 202 off after midnight on a weekday if it is known that the server 202 will not be in use after midnight. This scheduled power off would also account for instances where an individual may leave the office and forget to power off their server 202. Once again, this will lead to reduced power consumption for the organization and better management of the server 202.

Similarly, the scheduler 212 may be configured to automatically set a time for the accessor 208 to access the server 202 and the identifier 210 to identify either a functionality level of an application 203 or an activity level of the server 202 within a set timeframe after each time the server 202 is turned on. For example, if all servers 202 are turned on at 9:00 AM, the scheduler 212 may schedule the first access for 10:00 AM. Additionally, the scheduler 212 may generally set the first access by the accessor 208 to take place one hour after each server 202 is turned on, regardless of the turn on time. Accessing the server 202 within the first hour it is powered on will allow the central manager 206 to identify servers 202 that are not in use (e.g. activity level percentage is below threshold or less than 10%) or functioning adequately (negative functionality level determination) quickly and either terminate power to save money or notify the correct individuals to repair improperly functioning servers 202 and applications 203.

In exemplary aspects, teams of servers 202 can also be manually powered on or off based on the dynamic management of the data center and the central manager's 206 monitoring of the at least one server 202. For example, if the central manager 206's accessor 208 accesses one server 202 within a team of servers 202 that are dedicated to the same function (e.g. technology support) and determines that the activity level of that server 202 is less than the threshold percentage or the functionality level is negative, then all the servers 202 on that team may be manually configured to shut down based on the monitoring by the central manager 206. This may occur if a team of individuals in the specific department of an organization whose servers 202 are using the same applications 203 are on a break for a team outing and the central manager 206 determines that the functionality level is negative of one of the servers 202 within the team. The adjuster 216 may dynamically adjust the power of all the servers 202 associated with that team as all the servers 202 will not be utilized at that time. Additionally, the servers 202 can be manually powered off during a time when the server 202 will not be in use, including during lunch breaks and meetings when the individual or individuals using the servers will not be using the server 202. By allowing the manual override to power off a server 202 or multiple servers 202 during this time, there will be a decrease in costs.

Turning now to FIG. 5, a screen shot is depicted of interface 500 illustrating the dynamic management of servers by the central manager 206 of FIG. 2. Interface 500 comprises a group of servers 502 that are each tagged for monitoring. Each server is assigned a name under column 504. The name of each server may indicate the type of server, primary function, location, or may be arbitrary. The interface 500 also comprises Instance IDs 506 which indicate the assigned technical ID for each server, and an instance state 508. The instance state column 508 indicates whether the server is stopped or running. For example, server 510 is stopped or powered off while server 512 is running. As described herein, server 510 may be powered off because it is outside "normal" business hours, was manually powered off, or it may be powered off as a result of the system's monitoring and determination of either a negative functionality level or activity level percentage below the predetermined threshold percentage.

As described herein, the central manager may monitor server 512 on a predetermined schedule set by the scheduler 212 of FIG. 2 while server 512 is powered on. For example, if it is the beginning of a work day and the server was manually powered on at 9:00 AM, the scheduler 212 may determine when the accessor 208 and identifier 210 will access the server 202 to complete the initial monitoring and identifying of a functionality level or activity level percentage. If the functionality level is determined to be positive or if the activity level percentage is greater than the threshold percentage, then server 512 will remain powered on and the instance state will continue to say running. Following this, there may be subsequent monitoring by the system as set forth by the scheduler 212, which may include monitoring each hour or at some other regular or predetermined interval. If the functionality level determined is negative or if the activity level percentage is less than or equal to the predetermined threshold percentage, then the adjuster 216 may dynamically adjust the power of the server to off and the instance state will change from running to stopped.

Further, in some embodiments, the servers 502 may have the capability of a self-service environment, thereby resulting in manual management of the servers 502. In this instance, an individual user may initiate or shut off power on one or more servers at their discretion. For example, User A, may manually initiate Clinicals, while powering off ClinicalsFIHR based on need, current usage, or any other factor. Further, the ability to manually initiate or power off an individual server 502 may be based on privileges, thereby allowing only authorized users to be able to manually manage servers 502. It is also contemplated that different servers 502 may have different privileges associated with them. For example, a head administrator of a particular group of users utilizing servers 502 may have more privileges to manually manage the servers 502 in the data center than an individual technician. In this instance, the head administrator may have privileges to manage all servers 502, while a technician may only be able to manage non-core servers 502.

Figure 6:
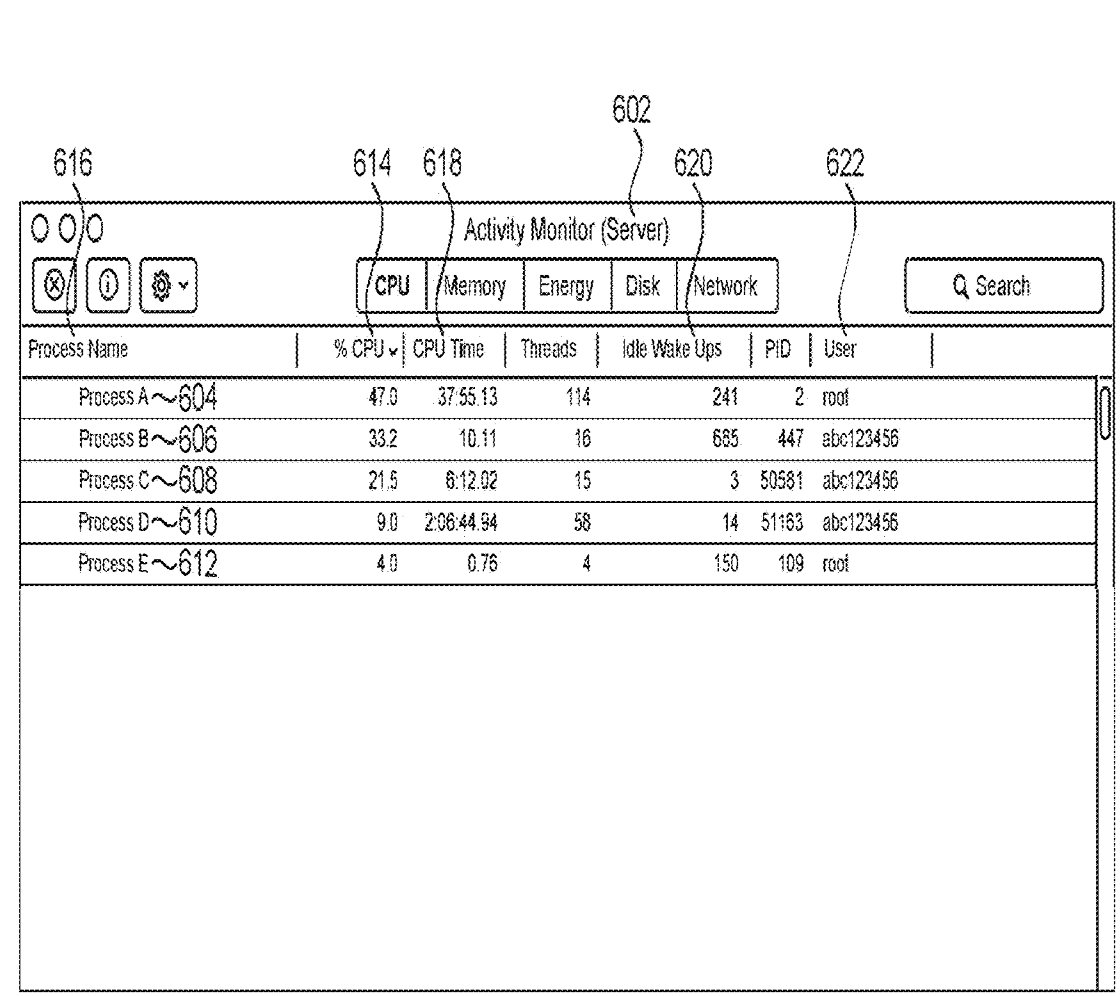
FIG. 6 is a screenshot showing a user interface where the activity level percentage is shown for the server being monitored in accordance with an embodiment of the present invention.

Finally, FIG. 6 illustrates a screenshot showing a user interface 600 where the central manager 206 of FIG. 2 is dynamically managing the server 602 by monitoring a central processing unit usage percentage or % CPU 614 of various processes. The CPU percentage indicates how much memory is being used on the server 602, which shows whether the server 602 is actively being used. Interface 600 depicts the monitoring of multiple processes, which are assigned names under column 616. The name of each process may indicate the type of application being run or may be arbitrary. In FIG. 6, there are 5 processes running on the sever 602: Process A 604, Process B 606, Process C 608, Process D 610, and Process E 612.

Each process 604, 606, 606, 608, 610, and 612 within server 602 is tagged for monitoring on a predetermined schedule determined by the scheduler 212 of FIG. 2. The accessor 208 of FIG. 2 will access the server 602 and the identifier 210 will identify an activity level percentage depicted under the % CPU 614 column for each process. For example, Process A has an activity level percentage of 47.0, while Process D has an activity level percentage of 9.0. In an embodiment where the predetermined activity level percentage threshold is 10%, the adjuster 216 may dynamically power off Process D or the adjuster 216 may power off the whole server 602 when one or more processes are functioning below the predetermined activity level percentage. Additionally, it is contemplated that the determination of whether to power off the server 602 may depend on the function of the process in column 616. If the process with a % CPU below 10% is a core process, then the whole server 602 may be powered off. However, if the process in column 616 is not core to the server 602's function, the system may maintain power of the server 602. Additional information may be monitored including CPU Time 618 (the time the process from column 616 has been running), Idle Wake Ups 620 (number of times the process has been woken up from going idle), and User 622 (user identification).

The present invention has been described in relation to particular embodiments, which are intended in all respects to be illustrative rather than restrictive. Further, the present invention is not limited to these embodiments, but variations and modifications may be made without departing from the scope of the present invention.

What is claimed is:

1. One or more computer readable non-transitory media having instructions that, when executed by one or more hardware processors, cause the one or more hardware processors to perform a plurality of operations, the plurality of operations comprising:

performing, via the one or more hardware processors, a first determination of an activity level of a server during a first time frame, wherein the first determination is performed during the first time frame based on a predetermined schedule for monitoring the server;

determining that the activity level during the first time frame is below a threshold percentage;

subsequent to determining that the activity level during the first time frame is below the threshold percentage:

performing, via the one or more hardware processors, a second determination of the activity level of the server during a second time frame, wherein the second determination is performed during the second time frame based on the predetermined schedule for monitoring the server;

determining that the activity level during the second time frame is still below the threshold percentage; and responsive to both (a) determining that the activity level during the first time frame is below the threshold percentage and (b) subsequently determining that the activity level during the second time frame is still below the threshold percentage:

powering down the server via the one or more hardware processors.

2. The one or more computer readable non-transitory media of claim 1, wherein the threshold percentage remains unchanged for each activity level determination.

3. The one or more computer readable non-transitory media of claim 1, wherein the server is tagged for monitoring.

4. The one or more computer readable non-transitory media of claim 1, wherein the predetermined schedule indicates accessing the server at a first time on a first day and accessing the server at a second time on a second day.

5. The one or more computer readable non-transitory media of claim 1, wherein the predetermined schedule indicates accessing the server at a first time on a first day and accessing the server at a second time on a second day based on the server being tagged for monitoring at the first time and at the second time, respectively.

6. The one or more computer readable non-transitory media of claim 1, wherein determining that the activity level of the server is below the threshold percentage triggers the second determination.

7. The one or more computer readable non-transitory media of claim 1, wherein the predetermined schedule indicates accessing the server within a predetermined amount of time after the server is turned on.

8. A method, comprising:

performing, via one or more hardware processors, a first determination of an activity level of a server during a first time frame, wherein the first determination is performed during the first time frame based on a predetermined schedule for monitoring the server;

determining that the activity level during the first time frame is below a threshold percentage;

subsequent to determining that the activity level during the first time frame is below the threshold percentage:

performing, via the one or more hardware processors, a second determination of the activity level of the server during a second time frame, wherein the second determination is performed during the second time frame based on the predetermined schedule for monitoring the server;

determining that the activity level during the second time frame is still below the threshold percentage; and responsive to both (a) determining that the activity level during the first time frame is below the threshold percentage and (b) subsequently determining that the activity level during the second time frame is still below the threshold percentage:

powering down the server via the one or more hardware processors.

9. The method of claim 8, wherein the threshold percentage remains the unchanged for each activity level determination.

10. The method of claim 8, wherein the server is tagged for monitoring.

11. The method of claim 8, wherein the predetermined schedule indicates accessing the server at a first time on a first day and accessing the server at a second time on a second day.

12. The method of claim 8, wherein the predetermined schedule indicates accessing the server at a first time on a first day and accessing the server at a second time on a second day based on the server being tagged for monitoring at the first time and at the second time, respectively.

13. The method of claim 8, wherein determining that the activity level of the server is below the threshold percentage triggers the second determination.

14. The method of claim 8, wherein the predetermined schedule indicates accessing the server within a predetermined amount of time after the server is turned on.

15. A system having one or more hardware processors configured to perform a plurality of operations, the plurality of operations comprising:

performing, via the one or more hardware processors, a first determination of an activity level of a server during a first time frame, wherein the first determination is performed during the first time frame based on a predetermined schedule for monitoring the server;

determining that the activity level during the first time frame is below a threshold percentage;

subsequent to determining that the activity level during the first time frame is below the threshold percentage:

performing, via the one or more hardware processors, a second determination of the activity level of the server during a second time frame, wherein the second determination is performed during the second time frame based on the predetermined schedule for monitoring the server;

determining that the activity level during the second time frame is still below the threshold percentage; and responsive to both (a) determining that the activity level during the first time frame is below the threshold percentage and (b) subsequently determining that the activity level during the second time frame is still below the threshold percentage:

powering down the server via the one or more hardware processors.

16. The system of claim 15, wherein the threshold percentage remains unchanged for each activity level determination.

17. The system of claim 15, wherein the server is tagged for monitoring.

18. The system of claim 15, wherein the predetermined schedule indicates accessing the server at a first time on a first day and accessing the server at a second time on a second day.

19. The system of claim 15, wherein the predetermined schedule indicates accessing the server at a first time on a first day and accessing the server at a second time on a second day based on the server being tagged for monitoring at the first time and at the second time, respectively.

20. The system of claim 15, wherein determining that the activity level of the server is below the threshold percentage triggers the second determination.

* * * * *